July 18, 1944.    C. F. OSGOOD    2,353,751
VALVE MECHANISM
Filed Dec. 31, 1940    2 Sheets-Sheet 1
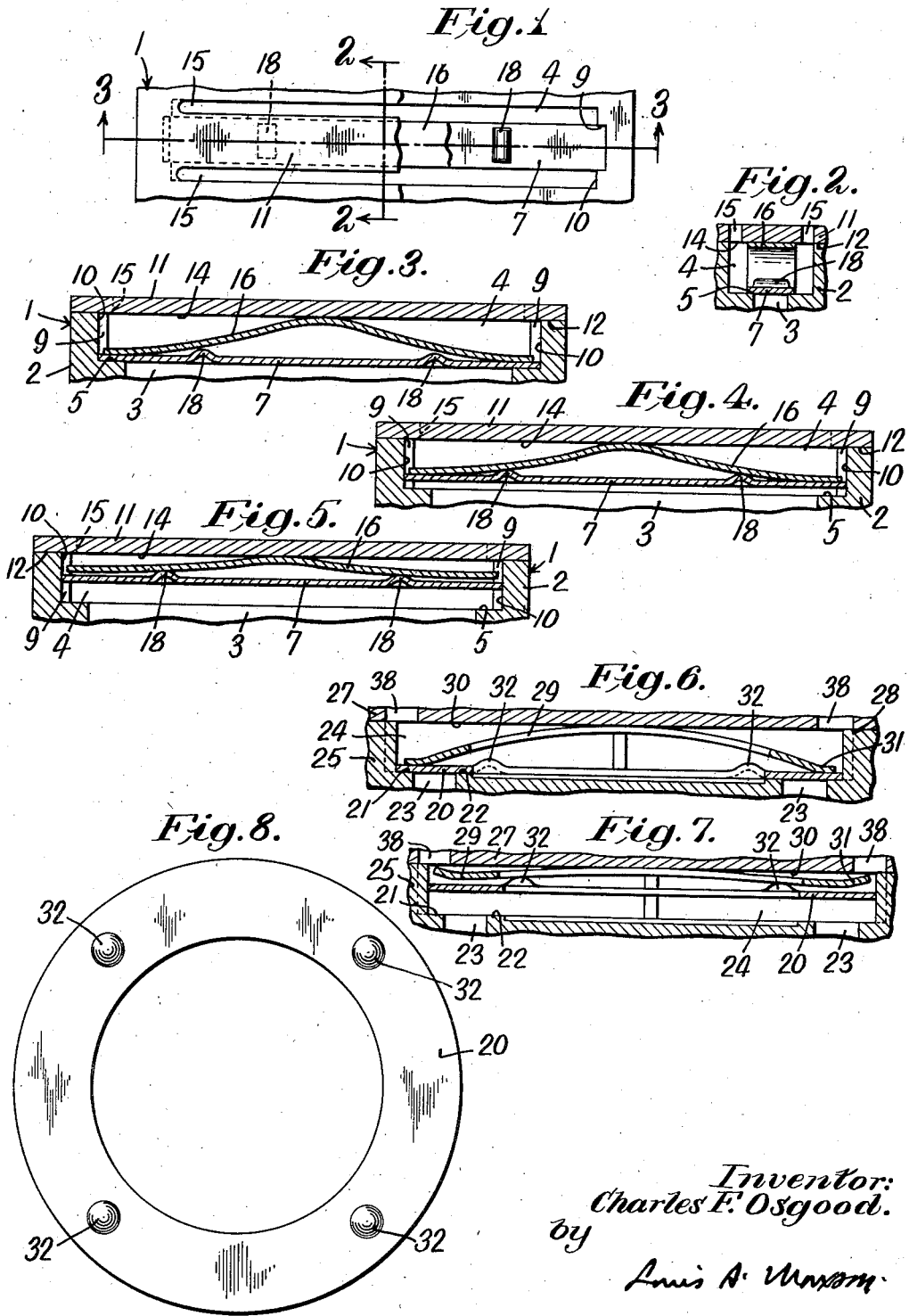
Inventor:
Charles F. Osgood.
by
Louis A. Maxson.
Atty.

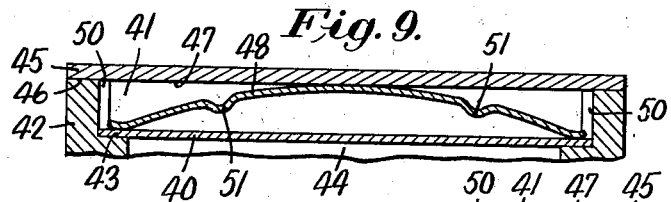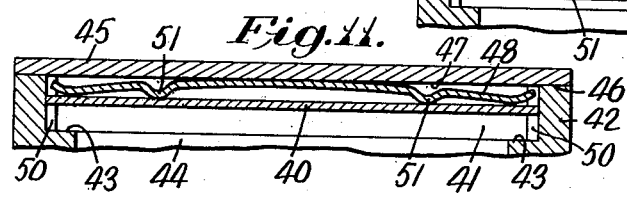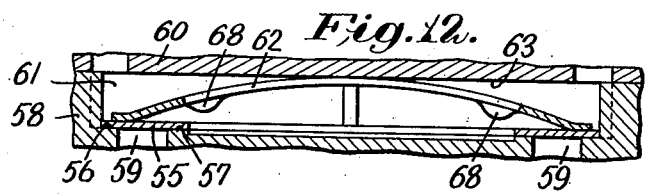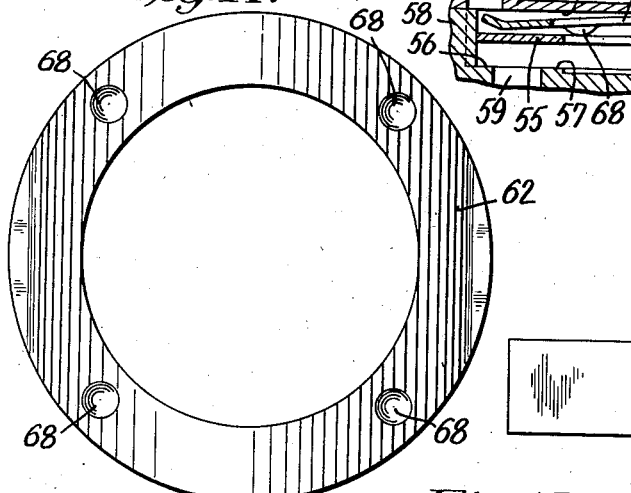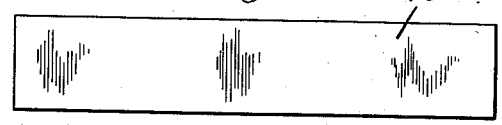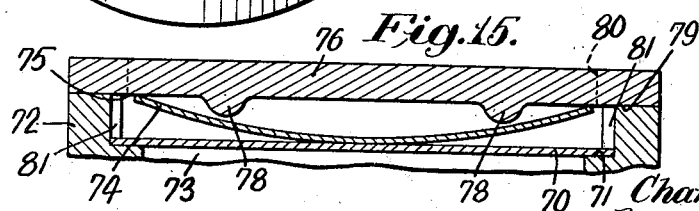

Patented July 18, 1944

2,353,751

UNITED STATES PATENT OFFICE 2,353,751

VALVE MECHANISM

Charles F. Osgood, Claremont, N. H., assignor to Sullivan Machinery Company, a corporation of Massachusetts Application December 31, 1940, Serial No. 372,445

22 Claims. (Cl. 251—119)

This invention relates to valve mechanisms, and more particularly to valve mechanisms for pumps, air compressors and the like.

It is desirable that valve mechanisms, particularly for gaseous fluid pumps, be made to open at minimum pressure differentials and yet be adequately cushioned to prevent breakage. In a valve mechanism in which an ordinary bowed ribbon-type spring or a transversely-flexed annular type spring is used between a plane valve member of a type similar to that of the spring and a conventional plane guard member, the convex side of the spring may engage either the valve member or the guard member at its central portion while the outer ends of the spring engage the other member. With this arrangement the unsupported length of the spring remains much the same throughout the major portion of the valve movement, and the deflection of the spring is directly proportional to the valve opening force. If there is a shortening of the length of the unsupported portions of the spring on a predetermined opening of the valve, it will be evident that there will be a definite increase in resistance to further valve opening movements and an increase in the cushioning effect. By the provision of means for modifying the spring action such as by forming projections on one of the members of the valve mechanism at points spaced between the contacts of the spring with the valve and guard when the valve is closed, contacts may be obtained between the projections and one of the other members on predetermined opening of the valve that effect the desired shortening of the unsupported spring portions. With such a spring-action-modifying arrangement there is obtained an initial opening of the valve that is a straight line function with respect to the force applied, and, on engagement of the projections mentioned with another member of the valve mechanism, further opening of the valve follows in accordance with a straight line function that is of steeper slope.

One object of my invention is to provide an improved valve mechanism. Another object is to provide an improved valve mechanism having improved means for increasing the resistance to valve opening movements after the valve has been opened a predetermined amount. A further object is to provide improved means for modifying the action of the spring after the valve has moved away from its seat a predetermined distance, sharply to increase the resistance to further opening movement of the valve. Still another object is to provide an improved valve mechanism having improved means for shortening the length of the spring arms on a predetermined opening of the valve and thereby effecting an increase in resistance to further valve opening movements. Other objects and advantages of the invention will hereinafter more fully appear.

In the accompanying drawings, in which several illustrative embodiments of the invention have been shown, Fig. 1 is a fragmentary plan view, with parts broken away, showing one embodiment of the invention incorporated in a strip or ribbon-type valve mechanism.

Fig. 2 is a cross sectional view of the valve mechanism of Fig. 1, taken on the plane of the line 2—2 of Fig. 1.

Fig. 3 is a longitudinal sectional view of the valve mechanism taken on the plane of the line 3—3 of Fig. 1.

Fig. 4 is a view similar to that of Fig. 3, showing the valve partly open.

Fig. 5 is a similar view, showing the valve in a further-opened position.

Fig. 6 is a fragmentary central sectional view showing an embodiment of the invention incorporated in an annular-type valve mechanism.

Fig. 7 is a view similar to Fig. 6, showing the valve in an open position.

Fig. 8 is a plan view of the valve element which is shown in Figs. 6 and 7.

Fig. 9 is a longitudinal sectional view showing an embodiment of the invention incorporated in a modified form of strip or ribbon-type valve mechanism.

Figs. 10 and 11 are views similar to Fig. 9, but show the valve in different unseated positions.

Fig. 12 is a fragmentary central sectional view showing a further embodiment of the invention incorporated in a modified form of an annular-type valve mechanism.

Fig. 13 is a view similar to Fig. 12, but showing the valve in an open position.

Fig. 14 is a plan view of the spring element shown in Figs. 12 and 13.

Fig. 15 is a longitudinal sectional view showing still another embodiment of the invention incorporated in a modified form of strip or ribbon-type valve mechanism.

Fig. 16 is a plan view of the valve element shown in Fig. 15.

In Figs. 1 to 5, inclusive, one form of my invention is shown incorporated in a strip or ribbon-type valve mechanism generally designated 1. This valve mechanism comprises a seat or cage element 2 having an elongated port 3 therein communicating with a recess 4, which opens through the upper surface of the seat or cage element. The dimensions of the recess 4 perpendicular to the axis of the port are substantially greater than corresponding dimensions of the port, and the recess is so formed that there is provided around the port a valve seat surface 5 with which a plane ribbon or strip-type valve element 7 cooperates.

The valve element 7 is desirably made relatively inflexible, and is so constructed and arranged, as by guiding it at its ends, that there is provided adequate space, when the valve is moved from its seat, for fluid to flow from the port 3 past the valve into the recess 4. In the mechanism shown the valve is of less width than the recess 4, but is sufficiently wide to cover and seal the port 3 when seated, and the valve is centered within the recess so that clearances are provided between the sides of the valve and the walls of the recess, through which fluid may flow when the valve is opened. In order to insure a covering of the port by the valve and a positioning of the valve to give uniform operation of the mechanism, there are provided means for guiding the valve which will maintain it parallel to the length of the port. The guiding means shown comprises vertically extending grooves 9 formed in the end walls 10 of the recess and within which the ends of the valve fit.

Fixed in any suitable manner to the top of the cage element 2 is a rigid guard element 11 having a surface 12 sealingly engaging the top surface of the cage element and also having a plane surface 14 facing the valve seat. Formed in the guard element are laterally spaced discharge passages 15 opening into the recess 4, through which fluid may pass from the recess 4. Arranged in the recess 4 is a bowed spring element 16 of the strip type, engaging, when in valve closing position, the surface of the guard element substantially only with line contact at points midway between the ends of the recess, and engaging, with its extremities, the top of the valve 7. The spring is made the same width as the valve and the ends of the spring extend part way into the grooves 9 when the valve is seated so that space is provided for the flexing of the spring when the valve is opened, and so that the spring is held in positions above the valve at all times. Were the spring element and the valve element each of uniform transverse cross section and conformation from end to end, the resistance to movements of the valve away from its seat would vary directly in proportion to the displacement of the valve from its seat. In order to obtain an increased cushioning effect, however, improved means are provided for reducing the length of the portions of the spring between its contacts with the guard and valve on predetermined opening of the valve. This means comprises, in the embodiment of the invention of Figs. 1 to 5, projections 18 formed on the valve at points spaced inwardly an equal distance from each of the contacts between the spring and valve when the valve is closed. The projections extend from the upper surface of the valve toward the spring and are so constructed and arranged that they are out of engagement with the spring when the valve is closed, but are moved into engagement, desirably along transversely extending lines of substantial lengths, with the spring on a predetermined opening of the valve. As the valve is moved in an opening direction from its closed position, the resistance to opening movement increases substantially in direct proportion to the distance it is moved until the projections 18 engage the spring. At this time the portions of the spring between its engagement with the guard member and the valve are shortened and the resistance to further valve opening movement is increased. Accordingly the valve element will be readily unseated, but upon approaching desired maximum opening it will be rapidly brought to rest. And its closing movements will be quickly started, but the slapping of the valve against its seat will not be unduly severe.

In Figs. 6 to 8, inclusive, there is shown a modification in which an annular valve element 20 is employed. This valve 20 coacts with concentric annular seat surfaces 21 and 22 surrounding annularly arranged flow passages 23 that open into a recess 24, which may be circular if desired, formed in a valve seat or cage element 25. A guard element 27 is suitably fixed to the top of the cage element and is in fluid tight engagement with the latter at 28 around the upper edge of the recess 24. Received within the recess 24 is a bowed annular type spring 29 having its convex central portion in engagement with a plane surface 30 on the guard element facing the valve seats, and having its outer edges farthest from the convex portions engaging the valve 20. The spring is bent as at 31 (Figs. 6 and 7) to provide surface contacts between the spring and valve that offer but little sliding resistance as the spring flexes on movement of the valve relative to its seats. To obtain an increased cushioning of the valve after a predetermined opening there are provided projections 32 on the valve spaced equal distances at each side of the points of engagement between the valve and spring. The projections are shown as being pressed in the valve and in this modification are spaced angularly above forty-five degrees from the centerline between the points of contact of the valve and spring. Due to the curvature of the spring and the engagement of the projections with sloping surfaces on the spring, there is a centering effect that keeps the spring and valve in proper positions relative to each other for assuring a uniform operation of the mechanism. If additional means are needed to hold the spring and valve against rotation relative to each other, there may be provided members fixed to the cage element and in engagement with the valve and spring, or there may be provided projections on the outer edges of the valve and spring that fit within grooves in the cage member, or flanges on the cage element may be made to fit notches in the valve and spring. Formed in the guard element are passages 38 opening into the recess 24 for conducting away fluid entering the recess around the valve from the flow passages 23.

The operation of this modification is similar to that of the ribbon-type valve mechanism described above. The resistance to opening movement of the valve increases directly with the amount of opening until the projections 32 engage the spring and then resistance to further opening movement increases sharply and continues to increase substantially directly in proportion to further valve opening but at a greater rate than that during the first portion of valve opening movement.

Figs. 9 to 11, inclusive, show a modification that is similar to that of Figs. 1 to 5, but in this case the projections are formed on the valve spring instead of upon the valve element. In this modification a valve element 40 of the plane strip or ribbon type is received in a recess 41 formed in a cage element 42, and the valve element 40 cooperates with a valve seat 43 surrounding an elongated port 44. A valve guard 45 has fluid tight engagement with the cage element at 46 and provides a plane surface 47 facing the valve seat. A bowed ribbon-type spring 48 is received in the recess 41 and the plane surface 47 is engaged by the convex side of the spring midway between the ends of the recess while the valve element is engaged by the ends of the spring. Grooves 50 in the end walls of the recess guide the valve element for movement relative to its seat and hold the spring in positions above the valve. Projections 51 formed on the valve spring at points spaced equally from its ends extend toward the valve element and are engaged by the latter on predetermined valve opening movement. Discharge passages similar to those shown in the modification of Figs. 1 to 5 may be provided in the guard element for carrying away fluid entering the recess 41 from the port 44.

The modification shown in Figs. 12 to 14, inclusive, is generally like that of Figs. 6 to 8, except that the projections are formed on the spring element. An annular valve 55 coacts with concentric seat surfaces 56 and 57 on a cage element 58 to control the flow of fluid through ports 59. A guard element 60 engages the cage element and acts with the latter to bound a valve chamber 61. A transversely bowed annular spring 62 has the central portion of its convex surface engaging a plane surface 63 on the guard element and its outer portions farthest from the convex portions engaging the valve. Projections 68 formed on the valve spring at points spaced equal angular distances from the center line extending between the points of contact of the spring and valve, extend toward the valve and are engaged by the latter on predetermined valve opening movement. On engagement of the projections with the valve the spring arms are shortened and resistance to further opening movement of the valve is increased, with the advantages above described with respect to other embodiments of the invention.

The length of the effective spring arms may also be shortened by forming projections on the valve guards so that they will be engaged by the valve spring on predetermined opening of the valve. Figs. 15 and 16 show a modification of the invention, with the projections so formed and arranged for use with a ribbon-type valve and valve spring. It will be evident that projections formed in this manner may also be employed with annular type valves and springs.

In Figs. 15 and 16 a strip or ribbon-type valve element 70 coacts with a valve seat 71 formed on a cage element 72 surrounding a port 73. A bowed ribbon-type spring 74 has its convex portion engaging the valve at points midway between the ends of the valve, and has its ends engaging a plane surface 75 on a valve guard 76. Projections 78 formed on the valve guard at points spaced inwardly equal distances from the valve seat extend toward the valve spring and are engaged by the latter as the valve is forced from its seat. The valve guard 76 is in fluid tight engagement with the cage element at 79, and formed in the guard are passages 80, of which but one is indicated, similar to the passages 15 of the first embodiment described, for conducting away fluid passing through the port 73. Guide portions 81 formed on the cage element hold the valve against movement laterally relative to the valve seat and hold the spring in its place above the valve.

Instead of deforming the valve or spring elements by bending to provide the projections on one element which coact with the other element to modify spring flexure during opening of the valve element, the projections may be welded or otherwise attached to the valve or spring elements, thereby to eliminate weakening of the spring or valve structure due to stresses created by such deformation by bending. Also the spring and valve elements may assume shapes other than those disclosed, for instance, the shape of a grid, or may assume the form of a flap or finger valve.

As a result of this invention there is provided an improved valve mechanism in which little resistance is offered to the unseating of the valve and more rapidly increasing resistance is provided for cushioning the valve. It will be noted that the parts of the mechanism are of simple construction and may easily be replaced. It will further be noted that the parts may easily be designed to give any desired resistances to opening movements of the valve. These and other objects and advantages of the invention will be clearly apparent to those skilled in the art.

While there are in this application specifically described several forms which the invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:

1. In a valve mechanism, in combination, means providing a valve seat, a valve guard element having a plane surface, a valve element coacting with said valve seat and having a plane surface facing the plane surface on said guard element, a spring element between said valve and guard elements contacting with the plane surface on each, said spring element contacting said guard element at points between its points of contact with said valve element, and projecting portions on said valve element free from engagement with said spring element during the early portions of valve opening movements and engageable with said spring element when said valve element is opened a predetermined amount to cause a modified flexure of said spring element.

2. In a valve mechanism, in combination, means providing a plane valve seat, a valve guard element having a plane surface, a valve element coacting with said valve seat and having a plane surface facing the plane surface on said guard element, a spring element between said valve and guard elements contacting with the plane surface on each, said spring element contacting said guard element between its places of contact with said valve element, and portions projecting from the plane surface on said valve element at points spaced equal distances from the points of contact between the valve and spring elements, said projecting portions being free from engagement with said spring element when said valve element is seated and engageable with said spring element when said valve element is partially opened to cause a modified flexure of said spring element.

3. In a valve mechanism, in combination, means providing a valve seat, a valve guard element, a valve element coacting with said valve seat, a spring element having substantially the same contour as said valve and arranged between said valve and guard elements contacting with said guard element at points between its points of contact with said valve element, and projecting portions on said spring element engageable initially substantially at their peaks by said valve element when said valve element is partially opened to cause a modified flexure of said spring element.

4. In a valve mechanism, in combination, means providing a valve seat, a valve guard element, a valve element coacting with said valve seat, a spring element between said valve and guard elements contacting with said guard element at points between its points of contact with said valve element, and projecting portions on said spring element engageable initially with another of said elements on partial opening of said valve element for modifying the flexure of said spring element, said projecting portions spaced equal distances from the points of contact between the valve and spring elements.

5. In a valve mechanism, a valve-seat-providing element, a plane valve coacting with said valve seat, a valve guard providing a plane abutment surface, a spring element between said valve and valve guard contacting said plane abutment surface on said guard at spaced points, and projecting portions on said guard extending toward said valve in advance of said plane abutment surface and engageable initially by said spring element on predetermined valve opening movement for modifying the flexure of said spring element.

6. In a valve mechanism, in combination, means providing a valve seat, a valve guard element, a strip valve element coacting with said valve seat, a spring element between said valve and guard elements contacting with one of the same between its places of contact with the other, and projecting portions on said spring element engageable initially substantially at their peaks with said valve element when the latter is partly opened to cause a modified flexure of said spring element.

7. In a valve mechanism, in combination, means providing a valve seat, a valve guard, a valve coacting with said valve seat, a spring between said valve and guard, said spring contacting with said valve between its places of contact with said guard, and projecting portions on said guard arranged between the points of contact of said spring with said guard and engageable initially substantially at their peaks with said spring when said valve is opened a predetermined amount, for modifying flexure of said spring on opening movements of said valve beyond said predetermined amount.

8. In a valve mechanism, in combination, means providing a plane valve seat, a guard element spaced from said seat and having a plane surface facing toward said seat in parallelism therewith, a valve element arranged to cooperate with said seat and having a plane surface facing said guard element, a spring element between said guard and valve elements and initially contacting the plane surface of each of said two last mentioned elements, engaging one of the same substantially midway between its points of engagement with the other, and projections on one of said three elements free from engagement with the others of said elements during early portions of valve opening movements and engageable initially substantially at their peaks with another of the same after predetermined opening of said valve element to vary the resistance to further opening movement of the latter.

9. In a valve mechanism, in combination, means providing a chamber having a plane valve seat at one side thereof, a guard element providing a cover for said chamber, said guard element spaced from said seat and having a plane surface facing toward said seat in parallelism therewith, a valve element arranged to cooperate with said seat and having a plane surface facing said guard element, a spring element arranged in said chamber between said guard and valve elements and initially contacting the plane surface of each of said two last mentioned elements, and projections on one of said three elements spaced equal distances from the points at which such element engages another of said elements and engageable initially substantially at their peaks with another of the same after a substantial opening of said valve element to vary the resistance to further opening movement of the latter.

10. In a valve mechanism, in combination, means providing a plane valve seat, a guard element spaced from said seat and having a plane surface facing toward said seat in parallelism therewith, a valve element of substantially uniform thickness throughout arranged to cooperate with said seat and having a plane surface facing said guard element and in parallelism with the plane surface thereon, a bowed spring element between said guard and valve elements and initially contacting the plane surface of each of said two last mentioned elements, engaging said guard element between its points of engagement with said valve element, and projecting portions on said valve element free from engagement with said spring element during the early portions of valve opening movements and engageable with said spring element after a predetermined opening of said valve element to vary the resistance to further opening movement of said valve element.

11. In a valve mechanism, in combination, means providing a plane valve seat traversed by a port, a guard element spaced from said seat and having a plane surface facing towards said seat and opposite said port, a valve element having portions respectively coacting with said seat and overlying said port, and a flexed spring element of substantially the same contour as said valve element between said valve element and said guard element and contacting with one of the latter at points between its contacts with the other, one of said elements having projections thereon of such height and shape that engagement between the same and another of said elements takes place initially substantially at the peaks of the projections when said valve element lifts a predetermined distance from its seat, whereby further opening movement of said valve element is attended by an increased rate of spring resistance, and of such width that they are confined wholly to a zone between the sides of said port.

12. In a valve mechanism, in combination, means providing a plane valve seat traversed by a port, a guard element spaced from said seat and having a plane surface facing towards said seat and opposite said port, a valve element having portions respectively coacting with said seat and overlying said port, and a flexed spring element of substantially the same contour as said valve element between said valve and guard elements and contacting with one of the latter at points between its contacts with the other, one of said valve and spring elements having projections struck up therefrom in positions spaced from the sides thereof and facing the other of said two elements, said projections being of such contour as to be initially engaged substantially at their peaks by the other element and of such height that engagement between the same and said latter element occurs when said valve element lifts a predetermined distance, less than its full opening movement, from its seat, whereby the final portions of the opening movement of said valve element are attended by an increased rate of spring resistance.

13. In a valve mechanism, in combination, means providing a plane valve seat traversed by a port longer than its width, means providing an oppositely facing, spaced guard surface, a valve member coacting with said seat and contacting the same when seated all around the edges of said port, a preflexed spring member of substantially the same contour as said valve contacting the guard surface and the valve member and engaging at least one of the same at points at opposite sides of its engagement with the other, one of said valve and spring members having projections extending toward the other and of relatively small extent in the direction of the major dimension of the port and wholly confined within the width of the port and adapted to have engagement initially substantially at their peaks with the other of said members, when said valve member is partially opened, at points thereon between the contacts which subsist between said members when the valve member is seated and thereby to modify the action of said spring member during the final portions of valve opening.

14. In a valve mechanism, in combination, means providing a plane valve seat, a guard spaced from said seat and having a plane surface facing toward said seat in parallelism therewith, a valve arranged to cooperate with said seat and having a plane surface facing said guard, a spring between said guard and valve and initially contacting the plane surfaces of said guard and valve, engaging one of the same between its points of engagement with the other and continuous in its portion opposite said valve between said last mentioned points of engagement, and means associated with said valve and spring and arranged intermediate the same and being free from engagement with said valve during early portions of valve opening movements and engageable initially with said valve after predetermined opening of said valve to vary the resistance to further opening movement of the latter.

15. In a valve mechanism, in combination, means providing a plane valve seat, a guard spaced from said seat and having a plane surface facing toward said seat in parallelism therewith, a valve arranged to cooperate with said seat and having a plane surface facing said guard, a spring between said guard and valve and initially contacting the plane surfaces of said guard and valve, engaging one of the same between its points of engagement with the other and continuous in its portion opposite said valve between said last mentioned points of engagement, and means associated with said valve and spring and arranged intermediate the same and being free from engagement with said valve during early portions of valve opening movements and engageable initially with said valve after predetermined opening of said valve to modify the action of said spring to vary the resistance to further opening movement of said valve.

16. In a valve mechanism, in combination, means providing a plane valve seat, a guard element spaced from said seat and having a plane surface facing toward said seat in parallelism therewith, a valve element arranged to cooperate with said seat and having a plane surface facing said guard element, a spring element arranged between said guard and valve elements and initially contacting plane surfaces of said guard and valve elements, engaging one of the same between its point of engagement with the other and continuous in its portion opposite said valve element between said last mentioned points of engagement, and means on one of said three elements and being free from engagement with the others during early portions of the opening movements of said valve element and engageable initially with another of the same after predetermined opening of said valve element to vary the resistance to further opening movement of the latter.

17. In a valve mechanism, in combination, means providing a valve seat, a valve guard element, a valve element coacting with said valve seat, a spring element between said valve and guard elements contacting with one of the same between its places of contact with the other and comprising spring arm portions each contacting at least near its own opposite ends the valve element and the guard element, and projecting portions on said spring arm portions between said points of contact of the latter and free from engagement with said valve element when the latter is seater and engageable with said valve element when the latter is partly opened to cause a modified flexure of said spring element.

18. In a valve mechanism, in combination, means providing a valve seat. a valve guard element, a valve coacting with said valve seat, a spring element between said valve and said guard element, said spring element contacting with said valve between its places of contact with said guard element and comprising spring arms each contacting near its opposite ends said valve and said guard element respectively, and projecting portions on one of said elements free from engagement with the other of said elements during early portions of valve opening movements and each engageable with the other element when said valve is opened a predetermined amount, at a location between the points of contact at the ends of one of said spring arms, for modifying flexure of said spring element on opening movements of said valve beyond said predetermined amount.

19. In a valve mechanism, in combination, means providing a plane valve seat, a guard spaced from said seat and having a plane surface facing toward said seat in parallelism therewith. a valve arranged to cooperated with said seat and having a plane surface facing said guard, a spring between said guard and valve and having a spring arm initially contacting at points respectively near its opposite ends the plane surfaces of said guard and valve, and means associated with said valve and spring and arranged intermediate the same and also intermediate the points contacted by the opposite ends of said arm and being free from engagement with said valve during early portions of valve opening movements and engageable initially with said valve after predetermined opening of said valve to vary the resistance to further opening movement of the latter.

20. In a valve mechanism, in combination, means providing a plane valve seat, a guard spaced from said seat and having a plane surface facing toward said seat in parallelism therewith, a valve arranged to cooperate with said seat and having a plane surface facing said guard, a spring between said guard and valve and having a plurality of spring arms each initially contacting at points respectively near its opposite ends the plane surfaces of said guard and valve, and means associated with said valve and spring and arranged intermediate the same and each also intermediate the points contacted by the opposite ends of one of said arms and each being free from engagement with said valve during early portions of valve opening movements and engageable initially with said valve after predetermined opening of said valve to modify the action of said spring to vary the resistance to further opening movement of said valve.

21. In a valve mechanism, in combination, means providing a valve seat, a guard spaced from said seat in parallelism therewith, a valve arranged to cooperate with said seat, a spring between said guard and valve comprising spring arms each initially contacting both the guard and valve, and means on said spring arms between the points of contact of the latter with the guard and valve and between said spring and said valve and being free from engagement with said valve during early portions of valve opening movements and engageable initially with said valve after predetermined opening of said valve to vary the resistance to further opening movement of the latter.

22. In a valve mechanism, in combination, means providing a valve seat, a guard spaced from said seat, a valve engageable with said seat and movable toward and from said guard, and means intermediate said valve and guard and contacting each of the same and having movement with respect thereto for yieldingly urging said valve toward said seat, said means including a flexible portion extending continuously between points of contact with the valve and guard and said means further embodying means ineffective during initial opening movements of said valve and rendered automatically effective only after said valve has moved away from its seat a predetermined distance to modify the action of said flexible portion to increase sharply the resistance opposed thereby to further opening movement of said valve.

CHARLES F. OSGOOD.

CERTIFICATE OF CORRECTION.

Patent No. 2,353,751. July 18, 1944.

CHARLES F. OSGOOD.

It is hereby certified that error appears in the printed specification of the above numbered patent requiring correction as follows: Page 2, second column, line 40, for the word "above" read --about--; page 5, second column, line 18, claim 16, for "point" read --points--; and second column, line 41, claim 17, for "seater" read --seated--; line 45, claim 18, after the word "seat" strike out the period and insert instead a comma; line 67, claim 19, after "with" strike out the period and insert instead a comma; same line, same claim, for "cooperated" read --cooperate--; and that the said Letters Patent should be read with this correction therein that the same may conform to the record of the case in the Patent Office.

Signed and sealed this 24th day of October, A. D. 1944.

Leslie Frazer

(Seal) Acting Commissioner of Patents.